United States Patent [19]
Bowman

[11] 3,824,982
[45] July 23, 1974

[54] MACHINE FOR CUTTING BRITTLE MATERIALS

[75] Inventor: John L. Bowman, Elmhurst, Ill.

[73] Assignee: Motorola, Inc., Franklin Park, Ill.

[22] Filed: July 2, 1973

[21] Appl. No.: 376,045

Related U.S. Application Data

[63] Continuation of Ser. No. 209,804, Dec. 20, 1971, abandoned.

[52] U.S. Cl. .................................. 125/16, 125/21
[51] Int. Cl. ............................................. B28d 1/08
[58] Field of Search .......................... 125/12, 16, 21

[56] References Cited
UNITED STATES PATENTS

| | | | |
|---|---|---|---|
| 3,155,087 | 11/1964 | Dreyfus................................ | 125/21 |
| 3,435,815 | 4/1969 | Forcier................................. | 125/16 R |

FOREIGN PATENTS OR APPLICATIONS

| | | | |
|---|---|---|---|
| 717,874 | 11/1954 | Great Britain ..................... | 125/16 R |

OTHER PUBLICATIONS

"Crystal Cutting," Machinery, December 9, 1955, volume 87, pages 1351-1353.

Primary Examiner—Othell M. Simpson
Assistant Examiner—Nicholas P. Godici
Attorney, Agent, or Firm—Eugene A. Parsons; Vincent R. Rauner

[57] ABSTRACT

A carriage having a pair of pulleys mounted thereon and mounted for reciprocating movements between a pair of fixedly positioned pulleys with switches positioned at each end of the path so as to be activated by the carriage as it reaches either end of the path. A plurality of pulleys mounted in spaced apart relationship to define a cutting area, one of said pulleys being driven by a reversible motor connected to the two switches to reverse each time the carriage reaches an end of the path. A continuous strand of wire extending from a wire supply to a take-up means and engaged around the pulleys of the carriage, the pulleys associated with the carriage and the pulleys defining the web to follow a continuous path from the supply to the take-up.

7 Claims, 2 Drawing Figures

PATENTED JUL 23 1974          3,824,982

3,824,982

MACHINE FOR CUTTING BRITTLE MATERIALS

This is a continuation, of application Ser. No. 209,804, filed 12/20/71, now abandoned.

BACKGROUND OF THE INVENTION

1. Field of the Invention

The present machine pertains to the sawing of samples of brittle materials, especially crystalline materials such as quartz, ceramics and simple or complex crystals of any kind, and substantially any other materials wherein fine cuts are required.

2. Description of the Prior Art

In the prior art a variety of saws for brittle materials have been developed wherein a continuous strand of thin, hard wire is guided over a plurality of pulleys to provide a plurality of parallel sections of wire spaced apart laterally a distance equal to the required thickness for the various components. In several of these prior art patents one of the pulleys is driven by a motor which is periodically reversed to reverse the direction of travel of the wires, relative to the material being cut, to provide the structure with a sawing action. For an example of this prior art device, see U.S. Pat. No. 3,155,087, entitled "Machine For Sawing Samples of Brittle Materials," issued to B. A. Dreyfus.

In these prior art devices, a toggle, or elongated arm pivotally mounted at the center, is utilized as a wire storage and switching mechanism to periodically reverse the motor driving the cutting wire. The major drawback in utilizing a toggle or pivotally connected arm is the limitation of the amount of wire which can be stored thereby. The amount of wire stored determines the amount of movement of the wire between reversals and, therefore, determines the sawing efficiency of the saw. Since a specified amount of time, determined by the components of the system, is required to stop the drive motor and wire and reverse the direction thereof, it can be seen that the system may be turned off (or running very slow) for as much or a greater time than it is sawing, depending upon the length of time and distance the wire travels. To increase the distance the wire travels in the prior art systems the pivotally mounted arm must be increased in length or the number of pulleys thereon must be increased. To increase the length of the arm, the machine must be increased in size and to increase the number of pulleys introduces additional wear.

SUMMARY OF THE INVENTION

The present invention pertains to an improved machine for cutting brittle materials including wire supply and take-up means with a plurality of wire guides defining a continuous wire path therebetween and further defining a cutting area, means for affixing a piece of material to be cut and for moving said piece toward and away from said cutting area, and switching means including a carriage mounted for linear movement along a predetermined path and containing pulleys engaged by the wire in the continuous path to move said carriage along said path and a reversible motor driving said wire along said path and operable by said switching means to reverse each time the carriage reaches an end of the path.

It is an object of the present invention to provide an improved machine for cutting brittle materials.

It is a further object of the present invention to provide an improved machine for cutting brittle materials including linear storage means for providing longer periods of time between switching or reversing of the direction of the cutting wire.

It is a further object of the present invention to provide storage means for use in switching the direction of the cutting wire, which storage means is believed to be more dependable and can be contained in a smaller area while increasing the time between reversals.

These and other objects of this invention will become apparent to those skilled in the art upon consideration of the accompanying specification, claims and drawing.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
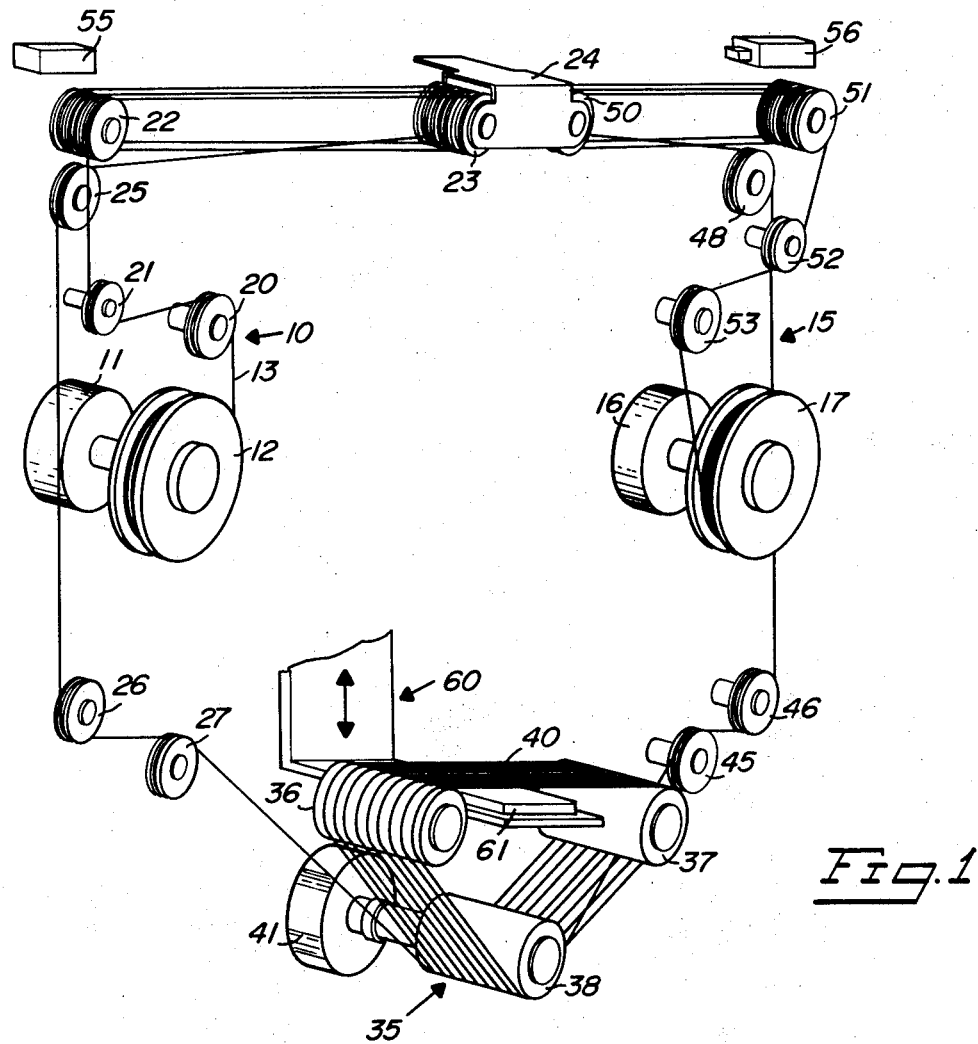
FIG. 1 is a semi-schematic view of an improved machine for cutting brittle materials embodying the present invention.

Referring to FIG. 1, the numeral 10 generally designates continuous wire supply means, which in this embodiment includes a drive motor 11 having a spool 12 of new wire 13 affixed to the shaft thereof for rotation therewith. It should be understood that a variety of continuous wire supply means might be devised by those skilled in the art but the motor 11 and spool 12 are illustrated because of their simplicity and ease of control and handling. Take-up means, generally designated 15 include a drive motor 16 and a take-up spool 17 affixed to the shaft thereof for rotation therewith. The drive motors 11 and 16 are generally energized and controlled to maintain a substantially constant movement of the wire 13 therebetween during cutting operations. Further, it is desirable to maintain a substantially constant tension on the wire 13 between the spools 12 and 17.

The wire 13, extending from the spool 12, is threadedly engaged over two spaced apart wire guide idler pulleys 20 and 21 and extends to a fixedly positioned, rotatably mounted, multi-groove pulley 22. A multi-groove pulley 23 is rotatably mounted on a carriage 24, which is in turn mounted for horizontal sliding movements toward and away from the pulley 22. The wire 13 extending to the pulley 22 is engaged over the pulleys 22 and 23 a plurality of times, somewhat in the fashion of a block and tackle, and extends therefrom over a wire guide idler pulley 25. From the idler pulley 25, the wire 13 extends downwardly to a pair of wire guide idler pulleys 26 and 27. The wire 13 extends from the pulley 27 to a web generally designated 35.

Web 35 includes three elongated generally parallel pulleys 36, 37 and 38 rotatably mounted at approximately the apexes of a triangle with an upper side lying approximately horizontally and in an upwardly directed relationship. Each of the pulleys 36, 37 and 38 has a plurality of grooves in the outer surface thereof and the wire 13 extending from the idler pulley 27 is engaged around the pulleys 36, 37 and 38 a plurality of times to form the web 35 defining an enclosed area therebetween. The wire 13 extending between the pulleys 36 and 37 in the upwardly directed flat side of the triangle defines a cutting area 40. It should be understood that other sides of the web 35 might be used for cutting areas but only the upper side is utilized to define cutting area 40 in this embodiment for simplicity of description. The pulley 38 is fixedly attached to the shaft of a drive motor 41, which upon proper energization rotates the pulley 38 and causes the wire 13 of the web 35, and especially the portions in the cutting area 40, to move at a substantially uniform speed.

The wire 13 leaving the web 35 passes across a pair of wire guide idler pulleys 45 and 46. Extending from the idler pulley 46, the wire 13 passes over a wire guide idler pulley 48 to a second pair of multi-groove pulleys 50 and 51, having the wire 13 engaged therearound a plurality of times. The pulley 50 is rotatably mounted on the carriage 24 and the pulley 51 is rotatably mounted in a fixed position adjacent the extreme end of the path of travel for the carriage 24 (the pulley 22 being mounted at the opposite extreme end). The pulleys 50 and 51, having the wire 13 engaged thereover a plurality of times, again form a generally block and tackle type operation. The wire 13 extends from the pulley 51 over a pair of wire guide idler pulleys 52 and 53 to the take-up spool 17 to complete the path thereof. It should of course be understood that the path of the wire 13 illustrated is selected to incorporate the various features of the present machine and those skilled in the art may include a variety of modifications without departing from the scope of this invention.

A first reversing switch 55 is fixedly positioned adjacent pulley 22 and a second reversing switch 56 is fixedly positioned adjacent pulley 51 for engagement by carriage 24 as it approaches pulley 22 and pulley 56, respectively. The reversing switches 55 and 56 are connected into the energizing circuit for motor 41 (as will be described in detail with reference to FIG. 2) to reverse the direction of rotation thereof each time one of the switches 55 or 56 is contacted by the carriage 24. The rotation of motor 41 causes rotation of all of the wire 13 in web 35 and pulls the wire 13 from the pulley 22 or the pulley 51 to move the carriage 24 toward the pulley 22 or the pulley 51, respectively, depending upon the direction of rotation of the motor 41. When the motor 41 has rotated the web 35 sufficiently to cause the carriage 24 to contact the switch 55, the direction of rotation of the motor 41 is reversed by the switch 55 and the direction of movement of the wire in web 35 is reversed. This reversal causes the carriage 24 to begin to move toward the pulley 51 and, upon contact of the carriage 24 with the switch 56, the direction of the motor 41 is again reversed, which reverses the direction of movement of the wire 13 in the web 35. Thus, the direction of movement of the wire 13 in the cutting area 40 is periodically reversed to produce a sawing action. It should be understood that the wire 13 moves continuously from the spool 12 to the spool 17 at a substantially constant rate even though the direction of movement of the wire 13 in the web 35 is periodically reversed. Thus, new wire is continually supplied to the cutting area 40.

A base, generally designated 60, for mounting a piece of material to be cut, such as the block 61 affixed to the upper surface of the base 60, is movably mounted adjacent the cutting area 40 by means not shown. The base 60 is mounted for vertical movement to apply the block of material 61 to the portions of wire 13 in the cutting area 40. The block of material 61 is affixed to the surface of the base 60 by any convenient means wherein the block of material 61 may be conveniently removed from the surface of the base 60 upon the completion of the cutting thereof. While the present embodiment illustrates the base 60 mounted for vertical movement, it should be understood that the base 60 might be positioned substantially anywhere along the flat open areas of the web 35 and, if desired, more than one base 60 might be utilized in conjunction with the web 35.

Figure 2:
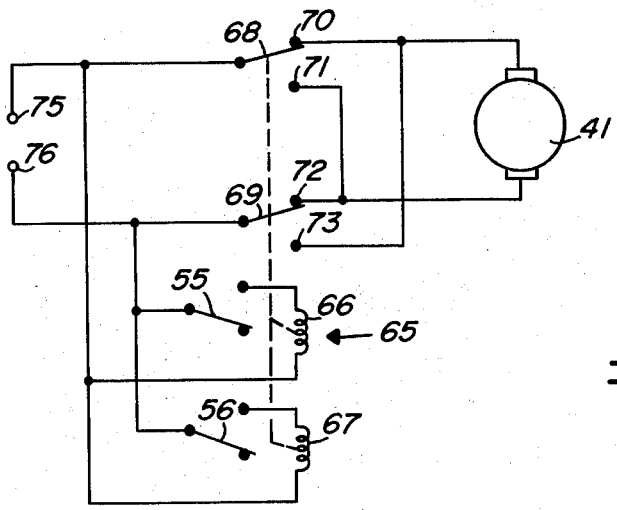
FIG. 2 is a schematic diagram of the electrical circuit for the web drive motor.

Referring to FIG. 2, the web drive motor 41 is illustrated schematically in connection with a control relay generally designated 65. Relay 65 includes first and second coils 66 and 67 and first and second movable contact arms 68 and 69 each having a pair of stationary contacts 70–71 and 72–73, respectively, associated therewith. The stationary contacts 70 and 73 are connected together and to one side of the motor 41 and the stationary contacts 71 and 72 are connected together and to the other side of the motor 41. The arms 68 and 69 are connected to a pair of terminals 75 and 76, adapted to have a suitable source of electrical power connected thereto. One side of each of the coils 66 and 67 is connected together and to the arm 68. The opposite side of the coil 66 is connected through the switch 55 to the arm 69 and the other side of the coil 67 is connected through the switch 56 to the arm 69. In this embodiment the switches 55 and 56 are normally open, momentary push-to-close switches. The relay 65 is the type wherein the arms 68 and 69 move into engagement with the contacts 70 and 72 when the coil 66 is energized and remain in engagement therewith, even though the coil 66 is deenergized, until the coil 67 is energized. When the coil 67 is energized the arms 68 and 69 move into engagement with the contacts 71 and 73 and remain there, even though the coil 67 is deenergized, until the coil 66 is energized.

Thus, in the figures the carriage 24 is moving from left to right (toward the switch 56) and the portions of wire 13 in the cutting area 40 are moving from left to right. When the carriage 24 reaches the end of its path of travel and engages the switch 56, the coil 67 will be energized and the arms 68 and 69 of the relay 65 will move into engagement with the contacts 71 and 73. Reversing the direction of voltage across the motor 41 will reverse the direction of rotation of the motor 41 and the wire within the web 35 will reverse direction, thereby causing the carriage 24 to move from the switch 56 toward the switch 55. It should be understood that many other electrical circuits might be utilized to reverse the motor 41 and the present circuit is illustrated for exemplary purposes.

Thus, it can be seen that the carriage 24 and the associated pulleys 22, 23, 50 and 51 provide a linear storage device. Because of the linear movement of the carriage 24 the tension in the wire 13 remains substantially constant and the cuts in the piece of material 61 are more uniform. It can be seen that the length of wire stored by the movement of the carriage 24 will determine the amount of rotation of the motor 41 between reversals thereof and, consequently, the amount of movement of the portions of wire 13 in the cutting area 40 between reversals thereof. The speed of the portions of wire 13 in the cutting area 40 remains relatively constant for the period of time during which the carriage 24 is traveling between the switches 55 and 56. When the carriage 24 engages one of the switches 55 and 56 there is a short slowdown or deceleration period, a reversal of direction and a short acceleration period during which the speed of the portions of wire 13 in the cutting area 40 is not constant. To obtain higher cutting efficiency and to reduce strain on the wire it is desirable to maintain the ratio of time during which the wire 13 is traveling at a constant speed to the time required to reverse directions of the wire, as high as possible and preferably around 90 percent. The length of wire stored in the storage device, in this embodiment the carriage 24 and associated pulleys, determines the ratio of time of constant speed to turnaround time. The length of wire stored in the storage apparatus of the present machine is equal to the number of pulleys or grooves in any one of the multi-groove pulleys 22, 23, 50 or 51 times two, times the distance the carriage 24 travels between stops. In the toggle systems of the prior art structures the radius of the pivotally mounted arm must be made extremely long to obtain near linear movement and to approach the desired ratio of time described above. The number of pulleys in the prior art systems can be increased to increase the amount of wire in the storage system (toggle) but additional pulleys introduce additional wear and, therefore, reduce the efficiency of the machine. In the present machine the linear motion of the carriage is easily incorporated into the machine without increasing the size thereof.

Thus, an improved machine for cutting brittle materials is disclosed which utilizes a linear storage carriage for wire to reduce or eliminate the errors caused by non-linear storage systems in prior art devices. Further, the linear storage carriage reduces the space required so that the overall machine can be constructed smaller and more compact. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. An improved machine for cutting brittle materials comprising:
   a. continuous wire supply means;
   b. take-up means for used wire;
   c. a plurality of wire guides defining a continuous wire path between said wire supply means and said take-up means and further defining a cutting area;
   d. material mounting means for rigidly affixing adjacent said cutting area pieces of material to be cut;
   e. said material mounting means and the wire within said cutting area being further mounted for relative converging and diverging movements; and
   f. switching means for producing relative reciprocating movements between wire in said cutting area and the piece of material to be cut, said switching means including
   a reversible motor and pulley means driven thereby,
   a carriage having pulley means thereon for cooperating with some of said wire guides to define a predetermined length of wire path within said continuous wire path operating to allow reversal of the wire in said cutting area with reversal of said motor, said carriage being mounted for reciprocating travel along a linear path between two of said wire guides positioned in spaced apart relationship, and
   switch means mounted for operation upon said carriage reaching each end of said path.

2. An improved machine as set forth in claim 1 wherein said continuous wire supply means includes a drive motor and spool driven by the shaft thereof and said take-up means includes a drive motor and spool driven by the shaft thereof, said drive motors being energized continuously during operation of said machine to continuously move new wire along said continuous path.

3. An improved machine as set forth in claim 1 wherein the switch means includes a switch mounted at each end of the path of said carriage and an abuttment on said carriage for activating one of said switches at each end of the path.

4. An improved machine as set forth in claim 1 wherein the pulley means on the carriage include two elongated pulleys, rotatably mounted generally parallel and the some of said wire guides include two elongated pulleys, rotatably mounted in spaced apart, fixed positions to define the predetermined path of the carriage therebetween.

5. An improved machine as set forth in claim 1 wherein said plurality of wire guides further include a plurality of parallel elongated pulley means fixedly positioned in spaced apart relationship for receiving a plurality of turns of wire therearound to define a web one side of which defines the cutting area.

6. An improved machine for cutting brittle materials comprising:
   a. continuous wire supply means;
   b. take-up means for used wire;
   c. a plurality of wire guides defining a continuous wire path between said wire supply means and said take-up means and further defining a cutting area;
   d. material mounting means for rigidly affixing adjacent said cutting area pieces of material to be cut;
   e. said material mounting means and the wire within said cutting area being further mounted for relative converging and diverging movements; and
   f. switching means for producing relative reciprocating movements between wire in said cutting area and the piece of material to be cut, said switching means including
   a reversible motor connected to rotatably drive one of said plurality of wire guides,
   a carriage having pulley means thereon for cooperating with some of said wire guides to define a storage means for wire within said continuous wire path operating to allow reversal of the wire in said cutting area with reversal of said motor, said carriage being mounted for reciprocating travel along a linear path between two of said wire guides positioned in spaced apart relationship, and
   switch means mounted for operation upon said carriage reaching each end of said linear path and connected to said reversible motor for reversing said reversible motor each time said switch means is operated.

7. An improved machine for cutting brittle materials comprising:
   a. continuous wire supply means;

b. take-up means for used wire;
c. a plurality of wire guides defining a continuous wire path between said wire supply means and said take-up means and further defining a cutting area;
d. material mounting means for rigidly affixing adjacent said cutting area pieces of material to be cut;
e. said material mounting means and the wire within said cutting area being further mounted for relative converging and diverging movements; and
f. linear wire storage means positioned in said continuous wire path with at least a portion thereof being mounted for reciprocating travel along a linear path to provide reversible linear movement of the wire within said storage means for producing relative reciprocating movements between wire in said cutting area and the piece of material to be cut.

* * * * *